Patented Feb. 27, 1934

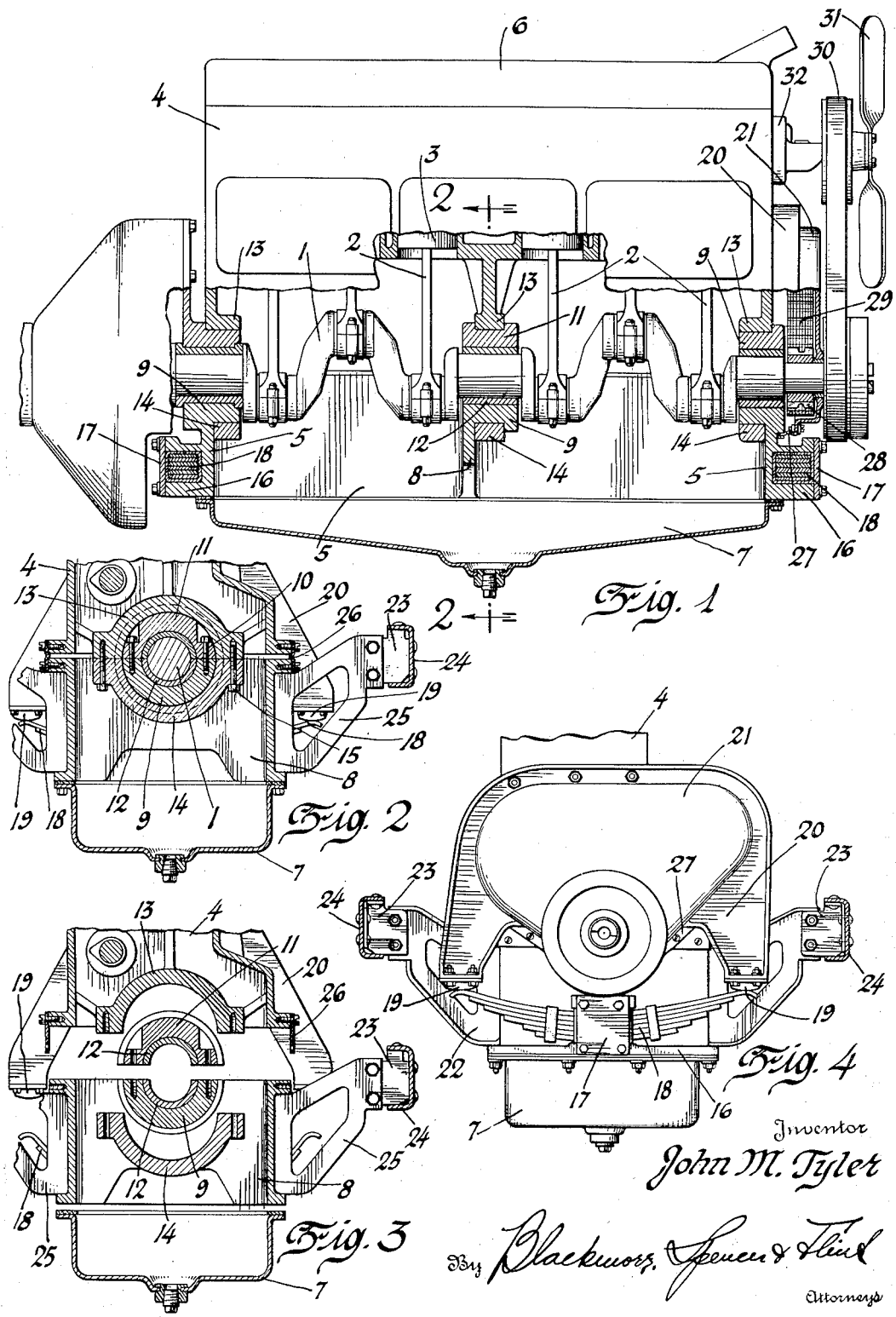

1,948,810

UNITED STATES PATENT OFFICE 1,948,810

METHOD OF ATTACHING CYLINDER BLOCKS TO CRANK CASES

John M. Tyler, Detroit, Mich., assignor to General Motors Research Corporation, Detroit, Mich., a corporation of Delaware Application August 28, 1933. Serial No. 687,121

6 Claims. (Cl. 180—64)

This invention relates to internal combustion engines, and more particularly to an improved construction for damping vibratory reactions resulting from engine operation.

Considering a multiple cylinder engine, the principal moving parts are the reciprocatory pistons, which are guided by and slidable on bearing surfaces of the cylinder walls, and a rotatable crank shaft mounted on bearings in the engine crank case. Engine crank shafts and other rotatable bodies can be and usually are brought into balance by causing the center of mass and the center of rotation to coincide as nearly as possible, but the disturbing factors mainly responsible for vibration are the changes in speed and direction of movement of the pistons and connecting rods as well as irregular torque impulses and load variations.

With these things in mind, it is proposed to construct the bearing members for the crank shaft and pistons, respectively, as separate units arranged in a cooperative relation and joined to permit a relative movement which dissipates and damps the vibratory forces thereby nullifying their effect on the supporting structure. Since it has been found that the annoying vibrations due to torque reactions apparently tend to swing the cylinder block about the axis of the crank shaft, the present invention contemplates, in accordance with such theory, the provision of a pivotal joint between the cylinder block and crank case for relative rocking movement about the crank shaft axis.

The invention will be best understood upon reference to the accompanying drawing, in which Figure 1 is a side elevation of an internal combustion engine intended for use in motor vehicles, parts thereof being broken away and shown in section; Figure 2 is a transverse section of the engine, and is taken on line 2—2 of Figure 1; Figure 3 is an exploded view of the parts shown in Figure 2, and Figure 4 is a front elevation of the engine.

Referring to the drawing, the reference numeral 1 indicates a crank shaft for a six cylinder internal combustion engine of the automotive type, each throw of which is connected by a rod 2 with a reciprocatory piston 3. The several pistons are slidable in the bores of the cylinder block 4, which comprises a casting formed independently of the crank case 5. As is customary, the cylinder block 4 is provided with a removable head 6, and the crank case has removably secured to the underside thereof an oil pan 7. Both end walls of the crank case 5 and also an intermediate web or wall 8 are provided in the present instance with a semi-circular extension 9, to which is removably secured by bolts 10, a cap 11 to enclose a bearing liner 12, constituting a main bearing for the engine crank shaft 1. At corresponding points, the cylinder block 4 is provided with semi-circular bearing elements 13, each having a removable cap 14 fastened thereto by bolts 15 so as to pivotally mount the cylinder block on the crank case bearings on the axis of the rotatable crank shaft.

Either or both of the crank case end walls may be provided with a recessed extension 16 having a removable cover cap 17 and receiving therein a laminated leaf spring 18. As best shown in Figure 4, the leaf spring extends on both sides of the crank shaft axis and its opposite end portions bear against abutments or shoes 19, carried by depending arms 20, rigid with the cylinder block. The arms 20 at the front of the engine may for convenience be formed integral with the timing gear cover 21 while those at the rear may comprise parts integral with the cylinder block as will be obvious.

As will be readily apparent, the buffer spring 18, carried by the crank case and bearing at opposite ends on the cylinder block on both sides of the axis of rocking motion will tend to maintain the two parts in centered relation and will offer a yielding resistance to displacement in response to vibratory forces, so as to absorb the energy and nullify its annoying effect on the supporting structure or vehicle chassis frame.

Any convenient arrangement may be used for mounting the engine in the chassis frame, but it will be preferable to provide a mounting in which the inherent strength of the engine structure will aid rigidity of the frame. For this purpose the front of the engine may be secured to a cross member 22, mounted at opposite ends in frame brackets 23, riveted to the longitudinally extending members 24 of the chassis frame. At the rear of the crank case, a similar cross member 25 may be provided. If desired, the use of rubber or other resilient material may be used in the engine mounting for the purpose of sound insulation and the more complete isolation from the frame of engine vibrations.

In view of the fact that the interior of the cylinder block is in open communication with the crank case, some provision will be necessary for sealing the interior of the relatively movable units against leakage of lubricating oil contained therein. For this purpose there may be utilized a flap or strip 26 of suitable flexible material, extending over the clearance space between adjacent parts of the cylinder block and crank case and being secured along opposite edges in any suitable fashion. As shown in Figure 2, the oil seal strip will have a certain amount of slack when the parts are in centered position, in order to accommodate relative movement in either direction without placing undue strain on the seal. A similar oil seal 27 will be provided at the front of the engine between the crank case and the timing gear cover 21, in view of the fact that the timing gear cover is mounted on and forms a part of the cylinder block.

It should be pointed out here that the timing mechanism includes a driving sprocket 28 on the engine crank shaft driving a chain 29, which passes over a driven sprocket on the engine cam shaft mounted in the cylinder block. Since the driving sprocket 28 is mounted on the crank shaft and the axis of the crank shaft coincides with the axis of the rocking movement of the cylinder block, any rocking of the cylinder block carries the cam shaft through an arc, which has as its center the axis of the timing gear driving sprocket. Thus the relative rocking movement of the cylinder block will in no way affect the operation of the timing mechanism. For the same reason, relative rocking movement will produce no slack nor tautness in the driving belt 30 for the radiator fan 31 and water pump 32, both carried by the cylinder block.

The assembly of the parts will be best effected if the crank shaft is first placed in the semicircular extensions 9 of the crank case and then secured in place by the application of the caps 11. Thereafter the cylinder block may be dropped over the crank case with its bearing portions 13 fitting the peripheral surface of the cap 11. After the cap 14 is secured in place the assembly of the pistons and connecting rods and the application of other parts, including the mounting of the oil pan 7, may be made in accordance with the usual practices.

I claim:

1. In a motor vehicle, a chassis frame, an engine crank case, means to mount the crank case in the chassis frame, a crank shaft within the case, an engine cylinder block comprising a unit separate from said crank case, a series of bearing members associated with the crank case by which the crank shaft and cylinder block are both mounted for relative movement about a common axis, a leaf spring carried by the crank case and with its opposite ends projecting on opposite sides of said axis and engaging the cylinder block to center the same and yieldingly resist its movement and a flexible oil seal between the adjoining marginal portions of the engine cylinder block and crank case.

2. In combination, an internal combustion engine and a support therefor, said engine including a cylinder block and a crank case formed as separate members, means pivotally joining said members for relative rocking movement, means to mount one of the members on said support and resilient centering means for the other member.

3. In an internal combustion engine, a cylinder block, a crank case, pivotal means joining the cylinder block and crank case for relative rocking movement and resilient buffer means between the cylinder block and crank case for cushioning their relative movement.

4. In an internal combustion engine, a crank case including an oil pan, a cylinder block unit having a hollow chamber cooperating with the interior of said crank case, means pivotally connecting the crank case and cylinder block unit for relative rocking movement and a flexible seal between the block and crank case closing the interior thereof.

5. In an internal combustion engine, a crank shaft, a crank case having bearings in which the crank shaft is rotatably mounted, a cylinder block, means to connect said block to the crank case for relative rocking movement and a buffer between the crank case and cylinder block to cushion relative rocking movement.

6. In an internal combustion engine, a crank shaft, a crank case having spaced bearing elements, each comprising separable sections to receive the crank shaft therein, a cylinder block, means to rockably mount the cylinder block on the crank case, including a series of separable members associated with the block and adapted to embrace said bearing elements.

JOHN M. TYLER.